United States Patent [19]

Asada et al.

[11] Patent Number: 5,016,560

[45] Date of Patent: May 21, 1991

[54] DEVICE FOR IMAGE TONER DISTRIBUTION ON A DEVELOPING DEVICE

[75] Inventors: Tomoyuki Asada; Kaoru Nishida; Mamoru Shimono, all of Yokohama; Hideyuki Shinohara; Koichi Ando, both of Setagaya, all of Japan

[73] Assignee: Kabushiki Kaisha Toshiba, Kawasaki, Japan

[21] Appl. No.: 342,812

[22] Filed: Apr. 25, 1989

[30] Foreign Application Priority Data

Apr. 28, 1988 [JP] Japan ................................ 63-104114

[51] Int. Cl.[5] ............................................ C03G 15/06
[52] U.S. Cl. ...................................... 118/653; 355/259
[58] Field of Search ......................... 355/259; 118/653; 430/101

[56] References Cited

U.S. PATENT DOCUMENTS 4,244,322 1/1981 Nomura et al. ...................... 118/658
4,696,255 9/1987 Yano et al. ........................... 118/653
4,745,429 5/1988 Mukai et al. ......................... 118/656
4,760,422 7/1988 Seimiya et al. ................. 118/653 X

FOREIGN PATENT DOCUMENTS 62-218973 9/1987 Japan .................................. 355/259

*Primary Examiner*—Joan H. Pendegrass
*Attorney, Agent, or Firm*—Cushman, Darby & Cushman

[57] ABSTRACT

A developing device for developing an electrostatic latent image formed on an image carrier includes a roller which carries toner particles to the developing position and a porous foam member of a material such as urethane resin which contacts the roller. The porous foam member comes in contact with either a developing roller or a toner supply roller which supplies toner particles to the developing roller. Toner particles supported in the holes of the porous foam member are charged as the particles rub against the developing roller or toner supply roller, causing the particles to be readily transferred to the roller. The porous foam member causes the amount of toner particles supported on the surface of the developing roller or the toner-supply roller to be sufficient to prevent a reduction in the density of the toner image even directly after a larger amount of toner particles are consumed for developing a solid toner region for example.

5 Claims, 2 Drawing Sheets

DEVICE FOR IMAGE TONER DISTRIBUTION ON A DEVELOPING DEVICE

BACKGROUND OF THE INVENTION

The present invention relates to a developing device for transferring developing agents to an image carrier in an image forming apparatus.

In an image forming apparatus, such as an electronic copying machine, a developing device is customarily used for developing an electrostatic image formed on an image carrier such as a photosensitive body. One-component developers or two-component developers are used in developing apparatus of this type. Two-component developers include toner particles contributing to development and carrier particles for properly charging the toner particles. One-component developers are classified into magnetic and nonmagnetic developers.

A developing device using a non-magnetic single-component developing agent is disclosed in U.S. Pat. No. 4,745,429 by Mukai et al. This developing device includes a developing roller facing a photosensitive body, a toner supply roller which supplies toner to the developing roller and a coating blade which is pressed against the developing roller. Rotation of the toner supply roller causes toner particles to be transferred to the developing roller so as to form a thin toner layer on the developing roller. As the developing roller is rotated, a single-component toner, as a single-component developing agent, adheres to the surface of the developing roller by triboelectronic charges between a stainless steel coating blade and single-component toner particles, and between the developing roller and the single-component toner particles. Then, the single-component toner particles, supported on the developing roller are caused to adhere electrostatically to an electric image formed on a photosensitive body at the developing station facing the photosensitive body.

In the device described above, after an unusually large amount of toner is consumed for developing, such as for developing a solid toner image, the amount of toner transferred from the toner supply roller to the developing roller increases, but the amount of toner supported on the toner supply roller decreases. This is because insufficient time exists for friction between the toner supply roller, developing roller and toner to increase the charge on the toner sufficiently for enough toner to adhere to the toner supply roller. If only the rotation of the toner supply roller is relied upon to charge the toner, it is impossible to supply a sufficient amount of toner to achieve developing with a high image density.

A developing device using a magnetic single-component developing agent or a two-component developing agent is disclosed in U.S. Pat. No. 4,244,322. A developing roller includes a inside of the sleeve. The developing agent is magnetically supported on the surface of the sleeve so as to form a magnetic brush. The magnetic brush contacts the photosensitive body to develop the electrostatic latent image. In the device described above, after an unusually large amount of toner is consumed for developing, the magnetic brush is not sufficiently formed. Therefore, the density of the toner image becomes low.

In both devices as described above, the amount of toner supported on the developing roller is limited. For this reason, directly after an unusually large amount of toner is consumed, for example, for a solid toner region, it is impossible to supply the necessary amount of toner to the developing roller. For this reason, there is a problem that the density of the toner image becomes very low.

SUMMARY OF THE INVENTION

It is an object of the present invention to provide a developing device for an image forming apparatus, which can supply a sufficient amount of toner to the developing roller to prevent the density of the toner image from being low even directly after an unusually large amount of toner is consumed for developing a solid toner region, for example. According to one aspect of the present invention, there is provided a device for developing an electrostatic latent image on an image carrier in an image forming apparatus comprising a rotatable developer carrier means, facing the image carrier, for carrying developer to the image carrier and means, contacting the surface of the developer carrier means, for maintaining a constant amount of toner on the developer carrier means. The rotatable developer carrier means may be a developing roller developing roller.

DETAILED DESCRIPTION OF THE PREFERRED EMBODIMENT

Figure 1:
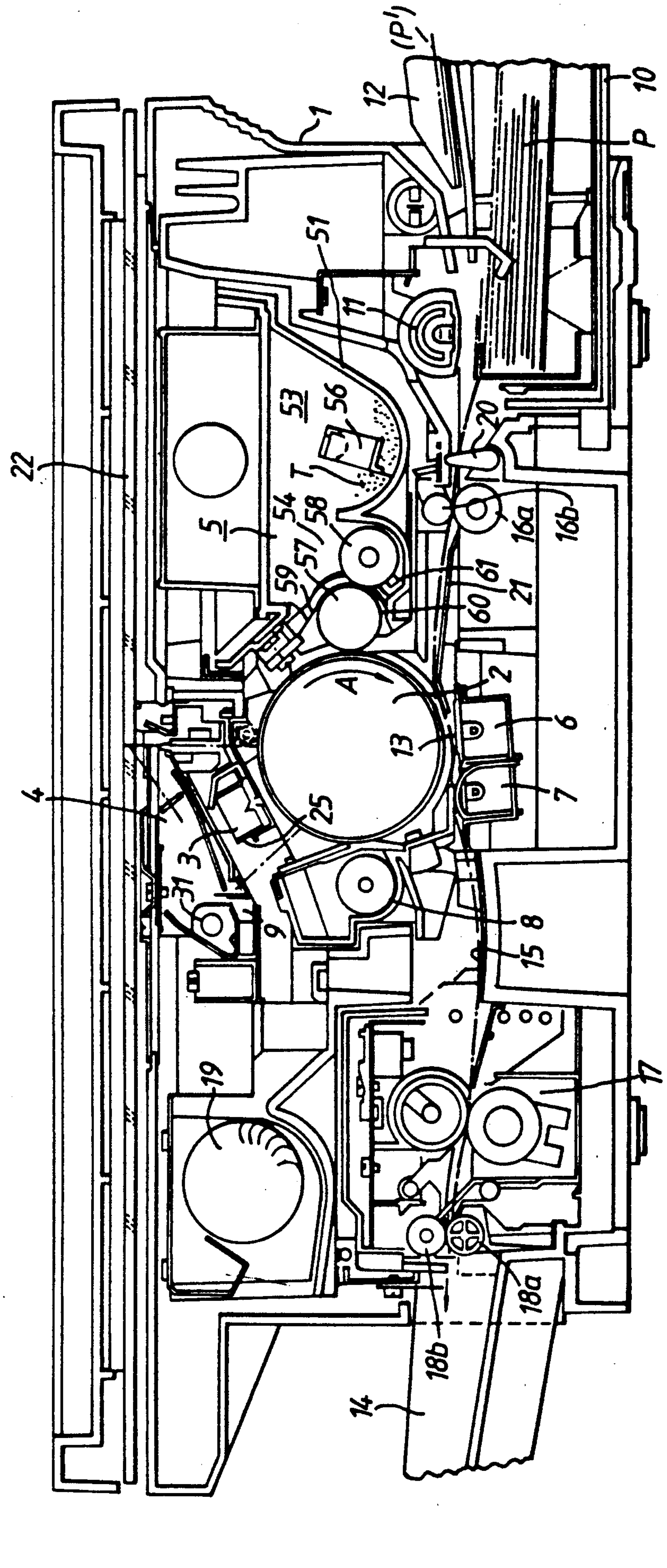
FIG. 1 is a schematic view showing an image forming apparatus according to the present invention.

One embodiment of the present invention will now be described in detail with reference to the accompanying drawings. FIG. 1 shows the construction of the copying machine according to the present invention.

In FIG. 1, numeral 1 designates a copying machine housing. An image carrier such as a drum-shaped photosensitive member 2 is disposed substantially in the center of the copying machine housing 1. Photosensitive member 2 is surrounded by a main charger 3, an exposure unit 4, a developing apparatus 5, a transfer unit 6, a separation unit 7, a cleaning unit 8 and an after-image erasing unit 9 which are arranged successively in the direction of the arrow shown in FIG. 1

A paper conveying path 15 is provided in the copying machine housing 1 so as to guide either a paper sheet P, automatically delivered from a paper cassette 10 by a paper supply roller 11 or manually supplied sheet P' from a sheet-bypass 12 into a receiving tray 14 through an image transfer region 13.

A pair of aligning rollers **16*a* and 16*b* are arranged in the middle of paper conveying path 15 upstream of image transfer region 13 and a fixing unit 17 and a pair of exit rollers 18*a* and 18*b* are arranged downstream of image transfer region 13. A cooling unit 19 is arranged above fixing unit 17. An aligning switch 20 is arranged near aligning rollers 16*a* and 16*b* to actuate aligning rollers 16*a* and 16*b*. Between rollers 16*a* and 16*b* and image transfer region 13, a paper conveying guide 21** is arranged.

Housing 1 carries thereon an original table 22 which can reciprocate in the horizontal direction.

The operation of the copying machine will be described. Photosensitive member 2 is rotated in the clockwise direction as indicated by the arrow in FIG. 1. Photosensitive member 2 is uniformly charged by the corona discharge of main charger 3. Exposure lamp 31 in exposure unit 4 projects light on photosensitive member 2 after reflection off of the original and as a result, an electrostatic image responsive to the image of the original is formed on the surface of photosensitive member 2. The electrostatic latent image formed in this manner is developed into a toner image by developing device 5 and the toner image is delivered to transfer region 13.

Meanwhile, the automatically or manually supplied sheet P or P' is fed into the copying machine housing 1 by aligning rollers 16*a* and 16*b* and then is transferred to image transfer region 13. Then, the toner image is transferred to the surface of sheet P or P' by transfer unit 6 in transfer region 13. Sheet P or P' is separated from photosensitive member 2 by separation unit 7 using corona discharge, and fed along conveying path 15 to fixing unit 17. Fixing unit 17 fixes the toner image on the surface of sheet P or P', which is discharged into receiving tray 14 by exit rollers 18*a* and 18*b*.

After the transfer of the toner image to sheet P (P'), residual toner remaining on the photosensitive member 2 is cleared by cleaning unit 8, and the potential on the photosensitive member 2 is lowered below a predetermined level by after image erasing unit 9 so that photosensitive member 2 is ready for a subsequent copying process.

Figure 2:
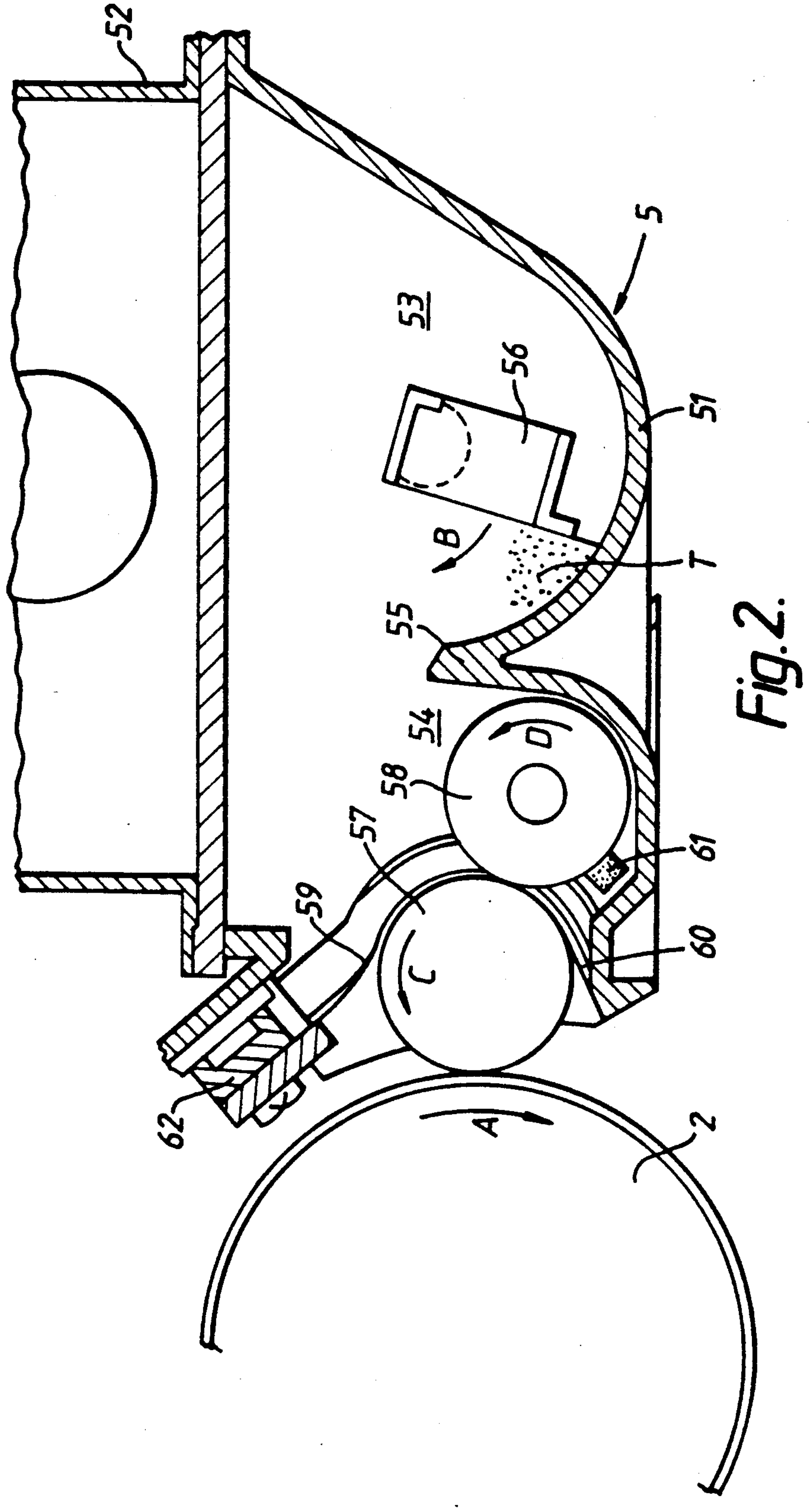
FIG. 2 is a schematic view showing the developing device according to the embodiment of FIG. 1.

Next, the construction of developing device 5 according to the present invention will be described with reference to FIG. 2. Developing device 5 includes a casing 51 for containing non-magnetic single-component toner and a toner cartridge 52, disposed on casing 51, for supplying toner to casing 51. Casing 51 is divided into a first space 53 and a second space 54 by a wall 55. In first space 53, a toner agitating member 56 rotates in the direction of the arrow B shown in FIG. 2. In second space 54, a developing roller 57 is positioned with a gap of about 300 um between it and photosensitive member 2 and is rotated in the direction of arrow C shown in FIG. 2. Also, a toner supply roller 58, in the form of a porous sponge roller, is positioned between wall 55 and developing roller 57 and is rotated in the direction of arrow D shown in FIG. 2. A coating blade 59 is elastically pressed against the surface of developing roller 57 at the upper portion of developing roller 57 by blade support 62 to uniformly form a thin layer of single-component toner on developing roller 57. A sealing blade 60 is elastically pressed against the surface of the developing roller 57 at the lower portion of developing roller 57.

At the lower portion of toner supply roller 58, a porous foam member 61 of a material such as urethane resin comes into contact with the surface of toner supply roller 58 with a nip width (i.e., amount of compression) of below 1 mm. One purpose of porous foam member 61 is to increase friction between toner and supply roller 58 so as to increase the charge on the toner to improve adhesion to supply roller 58.

Next the operation of the developing device will be described. Toner T supplied to first space 53 from toner cartridge 52 is transferred to second space 54 over wall 55 by rotation of the toner agitating member 56. The toner transferred to the second space is transferred to developing roller 57 by rotation of toner supply roller 58. By pressing coating blade 59 against developing roller 57, a thin layer of toner particles are formed on the surface of the developing roller 57. During the above process, the toner particles on developing roller 57 are triboelectrically charged. Then toner T is carried to the region facing the photosensitive member 2 by the rotation of the developing roller 57. After that, toner T is electrostatically transferred to photosensitive member 2 so as to develop the electrostatic latent image formed on photosensitive member 2.

Then residual toner remaining on developing roller 57 is cleared out by sealing blade 60 and is recovered in casing 51. Meanwhile, by the rotation of toner supply roller 58, a convenient amount of toner according to the amount of toner consumed for developing is supplied to developing roller 57 and by the coating blade 59, the layer of the toner is formed on the surface of the developing roller 57 again.

After an unusually large amount of toner is consumed for developing an electrostatic latent image to achieve a solid toner region, the amount of toner transferred from toner supply roller 58 to developing roller 57 increases and amount of toner supported on the surface of toner supply roller 58 decreases. In developing device 5 according to the present invention, however, porous foam member 61, of such a material as urethane resin, is positioned to contact the surface of toner supply roller 58 at the lower portion of toner supply roller 58 with a nip width of 0–1 mm between it and the toner supply roller 58. Toner T is supported in holes in urethane resin 61 pressed against toner supply roller 58, and this toner is quickly and accurately charged by rubbing with the surface of rotating toner supply roller 58. Therefore, toner is transferred to supply roller 58 by triboelectric charging. The amount of toner particles supported on the surface of the toner supply roller 58 is therefore allowed to be kept constant. Toner particles supported on the surface of the toner supply roller 58 are accurately electrically charged. Therefore, the density of the toner image does not become low even after an unusually large amount of toner is consumed to achieve solid toner developing.

Although only a single embodiment of this invention has been described in detail above, those skilled in the art will readily appreciate that modifications are possible in the preferred embodiment without materially departing from the novel teachings and advantages of this invention. Accordingly all such modifications are intended to be included in this invention as defined by the following claims

What is claimed is:

1. A device for developing an electrostatic latent image formed on the surface of an image carrier by applying a developer to said latent image at a developing position facing said image carrier, comprising:

means for transferring the developer to the developing position, said transferring means including a developing roller facing the image carrier and a toner supply roller which comes in contact with said developing roller and supplies toner particles to said developing roller; and a porous foam member having holes adapted for storing said developer, said foam member contacting a surface of said toner supply roller with a nip width of below 1 mm, for increasing friction between said developer, said toner supply roller, and said foam member to increase a frictionally generated electrical charge on said developer so that said developer is better attracted to said transferring means.

2. A device according to claim 1, wherein said developing roller is drum-shaped.

3. A device according to claim 1, wherein said developer is a non-magnetic single-component developer.

4. A device according to claim 1, wherein said porous foam member comprises a urethane resin pad.

5. A device according to claim 1, wherein said developing roller is rotated against said toner supply roller.

* * * * *